(12) United States Patent
Wilbert

(10) Patent No.: US 7,575,082 B2
(45) Date of Patent: Aug. 18, 2009

(54) ARRANGEMENT FOR FIXING A HEAT EXCHANGER, PARTICULARLY A COOLING MODULE IN A MOTOR VEHICLE

(75) Inventor: Ralf Wilbert, Gernlinden (DE)

(73) Assignee: BEHR GmbH & Co., KG, Stuttgart (DE)

( * ) Notice: Subject to any disclaimer, the term of this patent is extended or adjusted under 35 U.S.C. 154(b) by 45 days.

(21) Appl. No.: 10/583,031

(22) PCT Filed: Nov. 23, 2004

(86) PCT No.: PCT/EP2004/013271

§ 371 (c)(1),
(2), (4) Date: Nov. 15, 2006

(87) PCT Pub. No.: WO2005/059382

PCT Pub. Date: Jun. 30, 2005

(65) Prior Publication Data

US 2007/0172334 A1    Jul. 26, 2007

(30) Foreign Application Priority Data

Dec. 16, 2003   (DE) .............................. 103 59 357

(51) Int. Cl.
*B60K 11/04* (2006.01)
*F16B 23/00* (2006.01)

(52) U.S. Cl. ................. 180/68.4; 180/68.6; 165/67; 165/69

(58) Field of Classification Search ........... 180/68.4, 180/68.6; 165/67, 69
See application file for complete search history.

(56) References Cited

U.S. PATENT DOCUMENTS

| 1,300,275 | A |   | 4/1919 | Johnson |
|---|---|---|---|---|
| 4,139,053 | A | * | 2/1979 | Schaal ........................ 165/71 |
| 4,538,697 | A | * | 9/1985 | Muroi et al. ............... 180/68.4 |
| 4,564,168 | A | * | 1/1986 | Ikuta et al. .................. 248/638 |
| 4,579,184 | A | * | 4/1986 | Hiramoto ................... 180/68.4 |
| 4,651,839 | A | * | 3/1987 | Isobe ......................... 180/68.4 |
| 6,029,345 | A | * | 2/2000 | Christensen ............. 29/888.01 |
| 6,260,609 | B1 | * | 7/2001 | Takahashi .................... 165/69 |
| 6,349,928 | B1 | * | 2/2002 | Ko .......................... 267/141.4 |
| 6,412,581 | B2 | * | 7/2002 | Enomoto et al. ........... 180/68.4 |

(Continued)

FOREIGN PATENT DOCUMENTS

DE   40 30 720 A1   4/1991

(Continued)

*Primary Examiner*—Christopher P Ellis
*Assistant Examiner*—Jacob Meyer
(74) *Attorney, Agent, or Firm*—Foley & Lardner LLP

(57) ABSTRACT

The invention elates to an arrangement for fixing a heat exchanger (1), particularly a cooling module in a motor vehicle, preferably at four, i.e. two upper and two lower, fixing points (4, 5, 6, 7). Interengaging fixing means are provided on the heat exchanger (1) and retaining means are provided on the motor vehicle(2, 3). According to the invention, at least one fixing means, preferably the two upper fixing means, is/are embodied as an elastomer bearing (6a, 7a) and at least one retaining means, preferably the two upper retaining means, is/are embodied as a screw bolt (8, 9) with path limitation (8a, 9a), which is supported on the motor vehicle (3) and on the elastomer bearing (6a, 7a) in a substantially strainless manner.

13 Claims, 1 Drawing Sheet

U.S. PATENT DOCUMENTS

| | | | |
|---|---|---|---|
| 6,550,558 B2 * | 4/2003 | Yorwarth et al. | 180/68.4 |
| 6,957,711 B2 * | 10/2005 | Jung | 180/68.4 |
| 2001/0001994 A1 * | 5/2001 | Enomoto et al. | 180/68.4 |
| 2003/0062148 A1 * | 4/2003 | Ohki | 165/41 |
| 2003/0075305 A1 * | 4/2003 | Sanada et al. | 165/67 |
| 2005/0062315 A1 * | 3/2005 | Andritter et al. | 296/193.09 |
| 2005/0121170 A1 * | 6/2005 | Maeda et al. | 165/67 |
| 2005/0236141 A1 * | 10/2005 | Faure et al. | 165/67 |
| 2006/0037734 A1 * | 2/2006 | Miura | 165/67 |
| 2006/0054306 A1 * | 3/2006 | Kent et al. | 165/67 |
| 2007/0051493 A1 * | 3/2007 | Braic et al. | 165/67 |
| 2007/0251669 A1 * | 11/2007 | Hamida et al. | 165/67 |

FOREIGN PATENT DOCUMENTS

| | | | |
|---|---|---|---|
| DE | 4030720 A1 * | 4/1991 | |
| DE | 42 44 037 A1 | 6/1994 | |
| DE | 199 53 787 A1 | 5/2001 | |
| DE | 102 07 025 A1 | 8/2003 | |
| JP | 4-302705 A | 10/1992 | |

\* cited by examiner

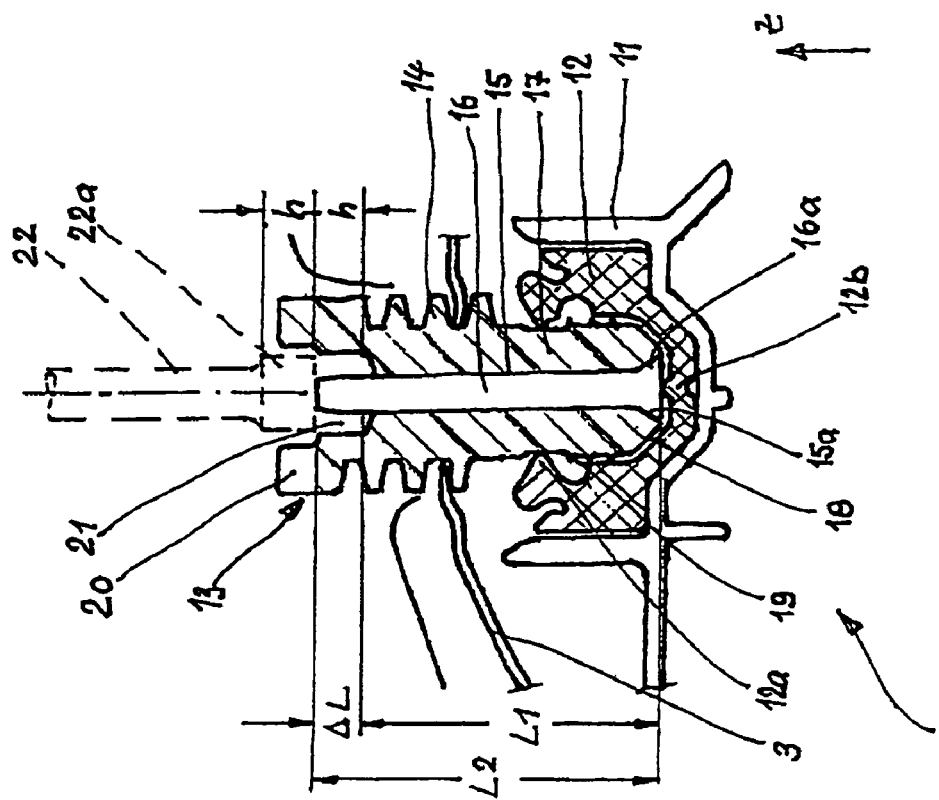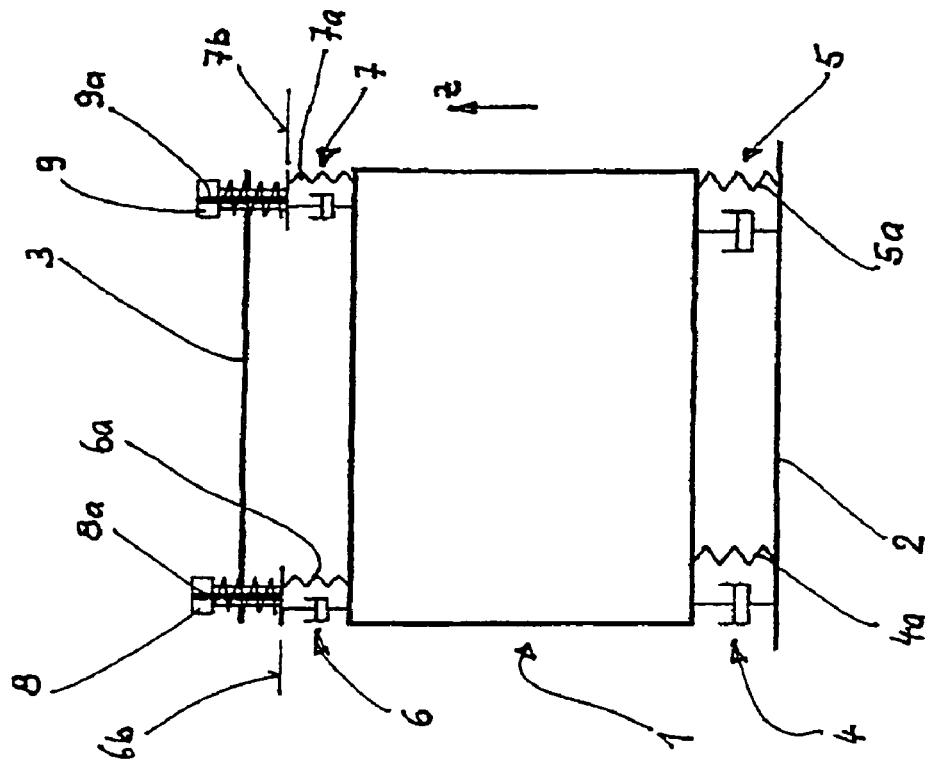

ARRANGEMENT FOR FIXING A HEAT EXCHANGER, PARTICULARLY A COOLING MODULE IN A MOTOR VEHICLE

The invention relates to a screw bolt for fixing components. The invention furthermore relates to an arrangement for fixing a heat exchanger, particularly a cooling module in a motor vehicle, and the invention also relates to a bearing for supporting a heat exchanger, particularly a cooling module in a motor vehicle.

Heat exchangers for motor vehicles, for example coolant/air coolers or what are referred to as cooling modules, comprising coolant/air cooler, condenser and/or charge air cooler, are arranged in the front engine compartment of the motor vehicle and are fixed there to the vehicle, for example to a lower cross member and an upper cross member, the "lock carrier". Fixing means for this in the form of journals, receiving openings or tabs are provided on the heat exchanger, for example on the coolant boxes of the cooler, while corresponding retaining means in the form of elastic bearings, for example rubber bushings, are provided on the vehicle. The heat exchanger or the cooling module is therefore frequently fixed in the vehicle at four fixing points, two lower and two upper fixing points, which is revealed, for example, in DE-C 4 244 037. The construction of a cooling module is described, for example, in DE-A 199 53 787.

In the case of a four-point mounting in the motor vehicle, the supporting heat exchanger (carrier of the cooling module) generally rests on the lower cross member with two lower journals in elastic bearings and is upwardly elastically supported against the lock carrier at two further fixing points. For this support, use is partly made of screw bolts which are screwed into the lock carrier using a mechanical screwdriver and are braced against the elastic bearing. Inaccuracies and tolerances caused by the manufacturing process on the components to be fixed and at the torque limit stop of the screwdriver sometimes lead to the elastic bearings being subjected to too great a strain, with the result that the heat exchanger is likewise strained, i.e. is under an increased compressive stress. In particular in the case of vehicles with a relatively soft body, a cooling module strained in such a manner in the vehicle may lead to vibrations being triggered and thus to undesired noise being generated.

It is therefore the object of the present invention to provide a screw bolt of the type mentioned at the beginning which permits strain-free installation; furthermore, it is the object of the invention to improve an arrangement for fixing a heat exchanger and a bearing for supporting a heat exchanger of the type mentioned at the beginning to the effect that strain-free installation and fixing of the heat exchanger in the motor vehicle are possible.

According to the invention, in the case of a screw bolt used as a stop, a displacement limit stop for the screw-in depth is provided in the form of a longitudinally moveable pin arranged in the screw.

During the screwing-in of the bolt, which takes place using a mechanical screwdriver, the pin is pushed outward upon contact with the component to be connected and pushes the screwdriver out of the screw bolt, so that the screwing-in operation is ended. This achieves the advantage of avoiding the components becoming strained because the screwing-in movement is broken off upon compressive contact of the bolt with the component to be supported. The pin is preferably arranged captively in the screw bolt, i.e. it is fitted together with the screw bolt. For this purpose, a screwdriver with an end profile is inserted into a corresponding receiving profile in the screw bolt, with the pin simultaneously being pushed outward. During the screwing-in, the pin therefore protrudes in the screwing-in direction and makes the initial contact with the other component, i.e. with the base of a blind hole. During the further screwing-in movement, the pin is pushed outward in the direction of the screwdriver until it ends flush with the end surface of the screw bolt and arrives against the stop. The length of the pin is dimensioned in such a manner that the protruding part in the screw head corresponds approximately to the engagement height of the screwdriver. The latter is therefore disengaged by the emergence of the pin.

Further advantageous refinements of the invention emerge from the subclaims. The screw bolt is preferably produced from plastic as is the pin arranged in its interior, i.e. in the longitudinal channel. A plastic bolt with a metal pin is also possible. Furthermore, a reversing lock is provided on the screw bolt, to be precise by means of annular ribs which are arranged on the circumference of the stem and are enclosed above a retaining lip of an elastic bearing bushing. The advantage is therefore achieved that the screw bolt does not turn back due to insufficient strain and becomes detached from its mount.

The invention is also achieved with an arrangement for fixing a heat exchanger in a motor vehicle. According to the invention, the heat exchanger or else an entire cooling module is supported in the vehicle, to be precise, preferably at four fixing points, two lower and two upper fixing points. The lower fixing points on a lower cross member are conventional, i.e. they comprise elastic bearing bushings in which journals of the heat exchanger engage. The two upper fixing points, preferably on the lock carrier of the motor vehicle, are depicted by means of screw bolts with a displacement limit stop. On the heat exchanger side, an elastic bearing of cup-shaped design is provided in which the screw bolt with a displacement limit stop engages, the screw bolt being screwed from above into the cross member using a compressed-air screwdriver. The displacement limit stop here is provided in order to avoid the elastic bearings becoming strained. The heat exchanger or the cooling module is preferably fixed with two screw bolts according to the invention. This achieves the advantage of avoiding the elastic bearings and therefore also the entire cooler or heat exchanger becoming strained. A decoupling of the cooler or cooling module at the bearing points is therefore also achieved. No vibrations are therefore transmitted by the vehicle, in particular passed on in the vertical direction (Z direction) and undesirable noises (humming) are avoided. The advantage is furthermore achieved that the screw bolts according to the invention with a displacement limit stop can be fitted mechanically (using a compressed-air screwdriver) without any strain occurring.

Finally, the object is also achieved by a bearing for supporting a heat exchanger, particularly a cooling module in a motor vehicle. This bearing can be used for fixing a heat exchanger, a cooling module or else other components in the motor vehicle, with a screw bolt with a displacement limit stop being provided as the retaining means which is supported on the motor vehicle, for example on a earner. The screw bolt engages with its free end in an elastic bearing which is of cup-shaped design and is fixed to the heat exchanger or another component. The screwing of the screw bolt into the carrier can take place mechanically and is interrupted by the displacement limit stop upon contact with the elastic bearing. The advantage of a strain-free fixing is therefore achieved for the bearing, which may also be of advantage in the case of pressure-sensitive components and automatic manufacturing.

An exemplary embodiment of the invention is illustrated in the drawing and is described in more detail below. In the drawing FIG. 1 shows a schematic illustration of the fixing of a cooling module in a motor vehicle, and FIG. 2 shows a bearing with screw bolts according to the invention with a displacement limit stop.

FIG. 1 shows, in a diagrammatic illustration, the fixing of a heat exchanger, designed as a coolant cooler 1, on a lower cross member 2 and an upper cross member 3, the "lock carrier" of a motor vehicle (not illustrated). The cooler 1 is (but does not have to be) the carrier of a cooling module (not illustrated) which has, for example, in addition to the cooler 1 a refrigerant condenser and a charge-air cooler which, for their part, are connected directly to the cooler 1. The cooler 1 has two lower bearings 4, 5 and two upper bearings 6, 7, i.e. is supported at four points with respect to the motor vehicle. The lower bearings 4, 5 correspond to the prior art and comprise an elastic bushing on the vehicle receiving a journal on the cooler in a form-fitting and frictional manner. Springs 4a, 5a illustrated diagrammatically represent the elastic rubber bushings (not illustrated). The upper supporting points 6, 7 are likewise elastic, which is indicated by springs 6a, 7a. Screw bolts 8, 9 are screwed into the cross member 3 in the region of the upper bearings 6, 7, the screw bolts having a displacement limit stop (indicated by a pin 8a, 9a) for the screw-in depth. The bearings 6, 7 on the cooler have an upper boundary plane 6b, 7b which is drawn in horizontally in each case and is in contact with the lower side of the screw bolts 8, 9. Owing to a built-in displacement limit stop 8a, 9a—which is explained below—said screw bolts are only screwed in to an extent such that the springs 6a, 7a are only negligibly strained if virtually at all. The two screw bolts 8, 9 therefore essentially act as a stop in the Z-direction (cf. lateral arrow Z), and, in the stationary state, the lower springs 4a, 5a are stressed only on account of the cooling-module weight bearing on them.

FIG. 2 shows a structural embodiment of an upper bearing 10 which corresponds to the diagrammatic illustrations 6, 7 of FIG. 1. That part of the bearing 10 which is on the cooler comprises a pot-shaped receptacle 11 which is connected directly or indirectly to the cooler 1 (FIG. 1). A cup-shaped bushing 12 with a retaining lip 12a and a base 12b made from an elastomeric material is arranged and fixed, for example, by adhesive bonding, in the upwardly open receptacle 11. A screw bolt 13 which has a screw thread 14 and is screwed into the lock carrier 3 engages in the cup-shaped bushing 12. The screw bolt 13, which is produced from plastic, has, in its interior, a longitudinal channel 15 which runs in the direction of the longitudinal axis of the screw bolt 13 and in which a pin 16 is held in a manner such that it slides in the longitudinal direction. The screw bolt 13 has, following the screw thread 14, a stem 17 and a lower end surface 18 with which it rests on the base 12b of the elastomeric bushing 12. Encircling ribs 19 are arranged in the region of the lower part of the stem 17. The encircling retaining rib 12a prevents or impedes an emergence or unscrewing of the screw bolt 13 from the blind-hole-like depression of the bushing 12. The screw bolt 13 has a screw head 20 with a recess or depression 21 which has an inner polygonal profile (not illustrated) for the insertion of a tool 22 (illustrated by dashed lines). The longitudinal channel 15 has a length L1 and the pin 16 guided therein has a length L2 which is greater than L1 by the differential amount ΔL. At its lower end, the pin 16 has a conically widened region 16a which rests on a bevel 15a of the longitudinal channel 15. The drawing shows the pin 16 on impact with the screw bolt 13, i.e. the end 16a of the pin is flush with the end surface 18 of the screw bolt 13. In this position, the other, upper end of the pin 16 protrudes upwards into the depression 21 by the amount ΔL. The tool 22, a compressed-air screwdriver, has a profiled head 22a (illustrated by dashed lines) which fits into the polygonal profile of the depression 21 but is blocked by the protruding pin 16, since the lower edge of the screw head 22a rests on the upper edge of the pin 16. The screw head 22a has an engagement height h which corresponds to the differential amount ΔL.

The screw bolt 13 with the displacement limit stop according to the invention is fitted as follows: the tool, i.e. the compressed-air screwdriver 22, is inserted with its head 22a into the depression 21 of the screw head 13 and therefore displaces the pin 16 in the direction of the end surface 18 from which the end 16a emerges; the end 16a therefore protrudes with respect to the end surface 18. With this pin position, the screw head 13 is inserted and screwed into the screw-in opening of the lock carrier 3, to be precise until the end 16a touches the base 12b of the bushing 12. The pin 16 is displaced outward into the depression 12 by the same extent as the screw bolt 13 is screwed into the lock carrier 3, and pushes the head 22a outward up to an amount ΔL=h, so that the head 22a is disengaged. The screwing-in operation is therefore ended before the elastomeric bushing 12 has become strained. On the contrary, the end surface 18 of the screw bolt 13 only has a contact with the elastic base 12b of the bushing 12 produced by touching. Since the bolt 13 is not under a compressive stress in the longitudinal direction, it could be turned back, but this is prevented by the retaining lip 12a in conjunction with the annular ribs 19. The screw bolt 13 is therefore captive after installation.

As already mentioned, the two bearings 6, 7 according to FIG. 1 are designed in accordance with the bearing 10 with the screw bolts 13 according to the invention with a displacement limit stop, so that the cooler 1 is supported in a manner free from stress.

The invention claimed is:

1. An arrangement for fixing a a cooling module in a motor vehicle, the cooling module including at least one heat exchanger, the arrangement comprising:
    fixing devices comprising an elastomeric bearing configured to be provided on the heat exchanger of the cooling module; and
    retaining devices comprising a screw bolt configured to be provided on the motor vehicle;
    wherein the bearing and the screw bolt are configured to engage with each other;
    wherein the screw bolt includes a displacement limit stop configured to limit a displacement of the screw bolt relative to the elastomeric bearing so as to support the screw bolt in an essentially strain-free manner on the motor vehicle and on the elastomeric bearing.

2. The arrangement as claimed in claim 1, wherein the screw bolt is screwed into a cross member arranged above the heat exchanger and the screw bolt is restricted in its screw-in depth by the displacement limit stop.

3. The arrangement as claimed in claim 2, wherein the retaining devices include lower retaining devices arranged on a lower cross member, wherein the cooling module is supported between the two cross members in a manner very substantially free from compressive stress.

4. The arrangement as claimed in claim 1, wherein the screw bolt comprises a screw head, a screw-in thread, a stem, an end surface, a depression configured for insertion of a tool which has an engagement height h, a longitudinal channel of length L1 extending from the screw head to the end surface, and a pin of length L2 which is longitudinally slidably arranged in the longitudinal channel, wherein L2 is larger than L1 by an amount ΔL, and ΔL corresponds to the engagement height h of the tool.

5. An arrangement for fixing a cooling module in a motor vehicle, the cooling module including at least one heat exchanger, the arrangement comprising:
   two upper connecting devices,
   wherein the upper connecting devices each comprise:
      an upper fixing device comprising an elastomeric bearing configured to be provided on an upper side of the cooling module; and
      an upper retaining device comprising a screw bolt configured to be provided on an upper cross member of the motor vehicle;
   wherein the elastomeric bearing and the screw bolt are configured to engage with each other;
   wherein the screw bolt is provided with a displacement limit stop configured to limit a displacement of the screw bolt relative to the elastomeric bearing so as to support the screw bolt in an essentially strain-free manner on the motor vehicle and on the elastomeric bearing.

6. The arrangement as claimed in claim 5, further comprising two lower connecting devices, wherein the lower connecting devices each comprise:
   lower fixing devices configured to be provided on a lower side of the cooling module; and
   lower retaining devices configured to be provided on a lower cross member of the motor vehicle;
   wherein the lower fixing devices are configured to abut against the lower retaining devices.

7. A motor vehicle, comprising:
   a cooling module comprising at least one heat exchanger,
   fixing devices comprising an elastomeric bearing provided on the heat exchanger of the cooling module; and
   retaining devices comprising a screw bolt provided on the motor vehicle;
   wherein the bearing and the screw bolt are engaged with each other;
   wherein the screw bolt includes a displacement limit stop configured to limit a displacement of the screw bolt relative to the elastomeric bearing;
   wherein the screw bolt is supported in an essentially strain-free manner on the motor vehicle and on the elastomeric bearing.

8. The arrangement as claimed in claim 1, wherein the elastomeric bearing comprises a cup-shaped bushing configured to accommodate the screw bolt.

9. The arrangement as claimed in claim 1, wherein the elastomeric bearing comprises a retaining lip configured to impede an un-screwing of the screw bolt.

10. The arrangement as claimed in claim 5, wherein the elastomeric bearing comprises a cup-shaped bushing configured to accommodate the screw bolt.

11. The arrangement as claimed in claim 5, wherein the elastomeric bearing comprises a retaining lip configured to impede an un-screwing of the screw bolt.

12. The arrangement as claimed in claim 7, wherein the elastomeric bearing comprises a cup-shaped bushing configured to accommodate the screw bolt.

13. The arrangement as claimed in claim 7, wherein the elastomeric bearing comprises a retaining lip configured to impede an un-screwing of the screw bolt.

* * * * *